April 27, 1926.  
L. J. WAHL  
1,582,320  
MOVABLE BLADE MOUNTING FOR CLIPPERS  
Filed Feb. 20, 1925 3 Sheets-Sheet 1
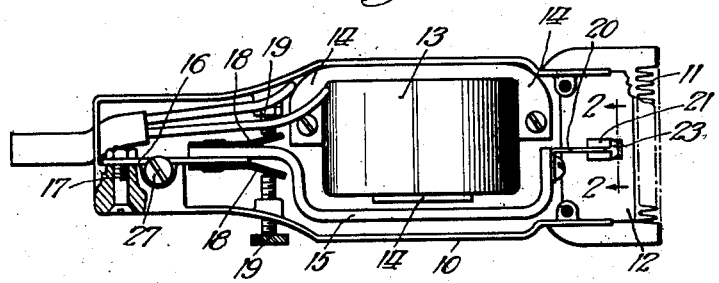
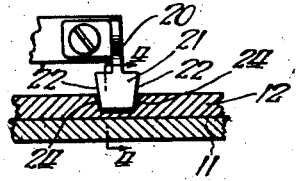 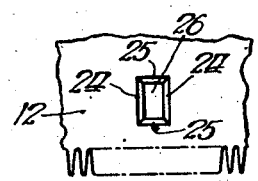
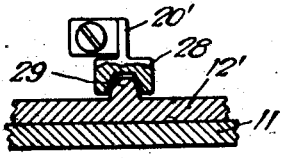 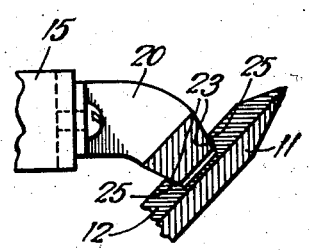
Inventor  
Leo J. Wahl

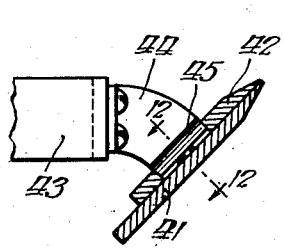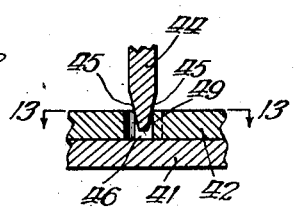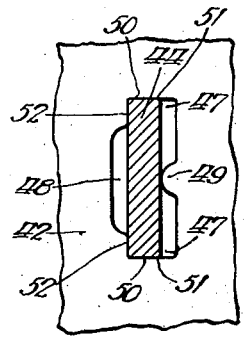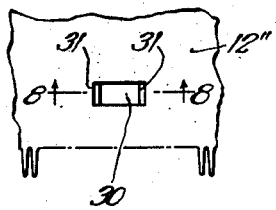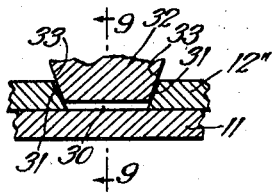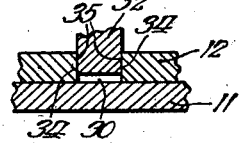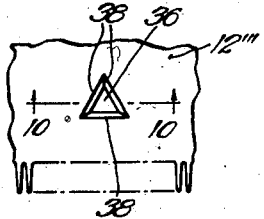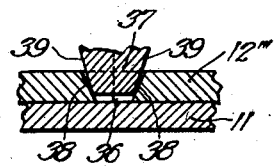

April 27, 1926.

L. J. WAHL 1,582,320

MOVABLE BLADE MOUNTING FOR CLIPPERS

Filed Feb. 20, 1925     3 Sheets-Sheet 3

Inventor
Leo J. Wahl
by Allap W Zabel Atty.

Patented Apr. 27, 1926.

1,582,320

UNITED STATES PATENT OFFICE.

LEO J. WAHL, OF STERLING, ILLINOIS.

MOVABLE-BLADE MOUNTING FOR CLIPPERS.

Application filed February 20, 1925. Serial No. 10,532.

*To all whom it may concern:*

Be it known that I, LEO J. WAHL, a citizen of the United States, residing at Sterling, in the county of Whiteside and State of Illinois, have invented a certain new and useful Improvement in Movable-Blade Mountings for Clippers, of which the following is a full, clear, concise, and exact description, reference being had to the accompanying drawings, forming a part of this specification.

My invention relates to a movable blade mounting for clippers and more particularly to the connection between the vibratory member and the movable blade in an electric clipper.

In a clipper having a stationary and a movable blade operated by a vibratory member, the movable blade as it reciprocates tends to travel in a slightly arcuate path. Also, due to the tension between the blades, the movable blade engages substantially flatly with the stationary blade. This causes a slight tilting action of the blade relative to the vibratory member.

It is a purpose of my invention to provide a connection between the vibratory member and the movable blade that will allow for the relative movement of the blade to the vibratory member without the employment of springs or other resilient or flexible members at the connection between the movable blade and the vibratory member.

It is a further purpose of the invention to provide a connection between the vibratory member and the movable blade comprising a socket member and a cooperating projection, said projection being held preferably in engagement with the socket due to the tension exerted between the blades. The tensioning means is ordinarily part of the vibratory system and is exerted through the connection between the movable blade and the vibratory member.

It is a further purpose of the invention to provide a connection between the vibratory member and the movable blade member comprising a co-operating socket and projection having co-operating wall portions so shaped that said projection engages the socket with a wedging action whereby the means for applying tension between the blades will hold the projection firmly within the socket for any position of the movable blade that it assumes in its reciprocating movements.

Other objects and advantages of the invention will appear as the description of the accompanying drawings proceeds. However, I desire to have it distinctly understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a top plan view of a clipper embodying one form of my improved blade mounting, the cover thereof being removed;

Fig. 2 is an enlarged fragmentary section taken on the line 2—2 of Fig. 1;

Fig. 3 is a fragmentary top plan view of the movable blade shown in Fig. 1;

Fig. 4 is a section taken on the line 4—4 of Fig. 2;

Fig. 5 is a view similar to Fig. 2 of a modified form of the invention;

Fig. 6 is a view similar to Fig. 3 of a further modification;

Fig. 7 is a similar view to Fig. 3 of still a further modification;

Fig. 8 is a fragmentary section taken on line 8—8 of Fig. 6;

Fig. 9 is a fragmentary section taken on line 9—9 of Fig. 8;

Fig. 10 is a section taken on line 10—10 of Fig. 7;

Fig. 11 is a view similar to Fig. 4 of a further modification;

Fig. 12 is a fragmentary section taken on line 12—12 of Fig. 11;

Fig. 13 is a fragmentary section taken on line 13—13 of Fig. 12;

Figure 14:
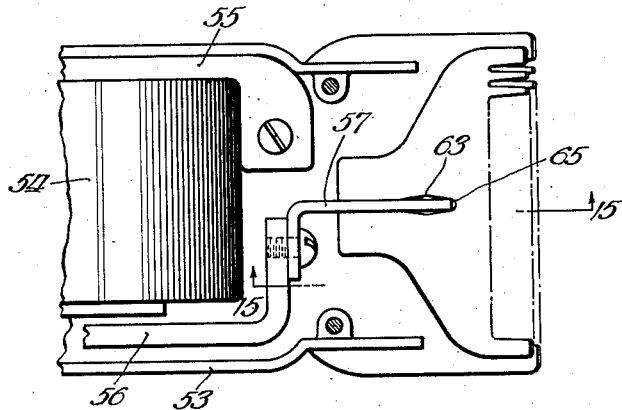
Fig. 14 is a fragmentary top plan view of a clipper embodying the form of the invention at present preferred.

Referring in detail to the drawings, my improved clipper comprises a casing 10 upon which is mounted the stationary blade 11 with which the movable blade 12 co-operates. Within the casing 10 is mounted an electro-magnet having a winding 13 and provided with a core 14, a vibratory member comprising an armature 15 co-operating with said electro-magnet and being vibrated thereby. Said vibratory member further comprises a resilient member 16 which is secured to the casing 10 by means of the clamping member 17 and is further provided with tuning springs 18 with which the adjusting screws 19 co-operate to tune the period of vibration of the vibratory member.

The vibratory member is further provided with a bracket 20 that is secured to the forward end of the armature 15 and which is provided with a head 21 having the beveled faces 22 and 23 so that said member 21 tapers on all sides from the bracket toward the movable blade 12. The beveled wall portions 22 and 23 are beveled at a greater angle to the face of the blade than the beveled wall portions 24 and 25 of the socket 26 provided in the movable blade 12.

A tension adjusting screw 27 is provided, the head of which engages with the upper edge of the member 16 and it will be evident that as the screw 27 is turned downwardly, the tension between the blades 11 and 12 is increased, while if it is moved upwardly, the tension will be diminished. As the pressure of the spring 16 is being exerted through the head 21 on the blade 12, it is evident that the lower edges of the beveled faces 22 and 23 will move along the faces 24 and 25 to seat the member 21 firmly in the socket 26. Due to the difference in the bevel of the faces on the member 21 from the beveled walls 24 and 25, the member 21 will engage firmly in the socket in spite of any slight tilting of the blade 12 relative to the armature 15 as the blade reaches the opposite ends of its reciprocating movement.

Obviously, instead of providing the socket on the blade 12, a projection can be provided thereon as shown in Fig. 5 in which the bracket 20' is shown as being provided with a socket member 28 and the blade 12' is shown as being provided with a projection 29, said projection and said socket having co-operating beveled portions as previously described, the walls of the member 28 being beveled at a smaller angle to the face of the blade than the corresponding walls of the projection 29.

It is also immaterial as to what is the shape of the co-operating projection and socket members as long as the recess and the projection are of such relative shape as to prevent turning of the blade 12 relative to the vibratory member and to the blade 11 and so that the beveled wall portions are provided to hold the projection firmly in the socket and yet allow the movable blade to have sufficient tilting movement so that the blades engage with each other flatwise throughout the range of movement of the movable blade.

In Figs. 6, 8 and 9, the blade 12" is shown as being provided with a socket 30 having beveled wall portions 31, the length thereof extending lengthwise of the blade instead of transversely thereof. The projection 32 is more sharply beveled than the co-operating wall portions 33. It is not necessary that the walls 34 and 35 be beveled. In fact, greater quietness of operation is obtained by having these walls straight as shown in Fig. 9.

In Figs. 7 and 10 the blade 12''' is shown as being provided with a triangular recess or socket 36 instead of a rectangular one with which a correspondingly shaped projection 37 co-operates. The walls 38 of the recess are beveled as shown in Figs. 7 and 10 and the walls 39 of the projection are more sharply beveled as will be clear from Fig. 7.

In Figs. 11, 12 and 13 a connection between the movable blade and the vibratory member is shown that is particularly advantageous because of the three-point contact provided between the projection and the walls of the socket member. This allows the projection to adjust itself in the socket as the blade is tilted relative to the vibratory member in its reciprocating movement and yet causes the projection to be held firmly in the socket by the resilient action of the tensioning means between the blades. The stationary blade is indicated in said figures by the numeral 41 and the movable blade by the numeral 42. Said movable blade is reciprocated by means of the vibratory member 43 which corresponds to the member 15 in Fig. 1 and is provided with similar means for applying distance between the blades as is the member 15. A bracket 44 is secured to the vibratory member 43, said bracket 44 being provided with beveled wall portions 45, thus providing a tapering projection at the end thereof which is adapted to enter the socket 46 in the movable blade 42. The socket 46 is formed in the plate 42 in any suitable manner as by punching and is made of a peculiar shape clearly shown in Fig. 13 to provide relatively narrow end portions 47 and a wider central portion 48 for the socket with a curved walled projection 49 opposite the wider portion 48. The edges 50 of the projection 44 engage with the end walls 51 of the recess or socket 46 and the tapering side walls 45 engage with the projection 49 and with the wall portions 52 to provide substantially a three-point engagement between the projection 44 and the walls of the socket 46.

It will be seen that due to this arrangement, the beveled or tapered walls 45 of the member 44 will be engaging with the walls of the socket at the points 49 and 52, no matter what the relative position of the member 44 and the movable blade 42 may be due to the tilting of the blade 42 during the back and forth movements thereof, the tension exerted on the vibratory member 43 by the resilient means for applying tension between the blades 41 and 42 always holding the beveled faces 45 in engagement with said walls at 49 and 52.

Figure 15:
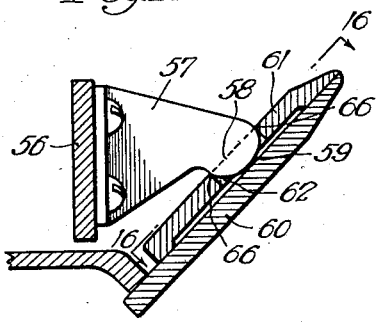
Fig. 15 is a section taken on line 15—15 of Fig. 14.
Figure 16:
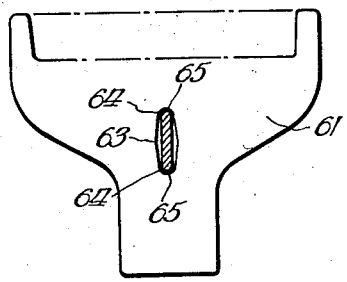
Fig. 16 is a section taken on line 16—16 of Fig. 15, the stationary blade being omitted.

In Figs. 14 to 16 inclusive, the form that appears to be the most practicable commercially at the present time is shown. In this arrangement no such great accuracy is required in the construction of the parts as is true where the beveled walls are provided on both socket and the projection and at the same time the projection is held as firmly in engagement with the socket as in the other forms previously described.

In the form shown in Figs. 14 to 16 inclusive, the casing 53 is provided with an electro-magnet having a coil 54, a core 55 and an armature 56 forming part of a vibratory member similar to the member 15. Said vibratory member is provided with a forwardly extending bracket member 57 which is provided with a downward projection 58 having a curved edge 59. The member 57 is preferably a punching and is of small thickness, as will be clear from Fig. 14. Mounted on the forward end of the casing 53 is the stationary blade 60 with which the movable blade 61 co-operates. The movable blade 61 is provided with a recess or socket 62 that is preferably punched out of the blade 61 with a suitable die, said opening or recess 62 being provided with a wider central portion 63 and narrower ends 64, said ends being preferably rounded as indicated at 65. The projection 58 is of such a width that the same engages with the walls of the recess adjacent the curved ends 65 thereof. The socket or opening 62 being punched out of the blade 61 will have slightly curved edges 66, these being retained by avoiding grinding the plate adjacent the opening 62.

It will be evident from the above, that in the form shown in Figs. 14 to 16 inclusive, the projection 58 will extend into the socket such a distance that the curved wall portion 59 will engage with the edges of the socket 62 adjacent the curved ends 65 and at the curved edges 66 thereof. This will permit a slight tilting of the blade 61 relative to the member 57 both transversely and longitudinally of the blade to allow for the necessary relative movement between the vibratory member and the movable blade during the reciprocation thereof. However, due to the resiliency of the tensioning means between the blades 61 and 60 acting through the projection 58 against the walls of the socket 62, the curved wall portion 59 will always be held in firm engagement with the socket 62, thus preventing any rattle of the blade 61 due to movement thereof relative to the member 57.

Having thus described my invention, what I desire to claim and secure by United States Letters Patent is:

1. In a clipper, a stationary blade, a movable blade, a vibratory member, means connecting said movable blade and said vibratory member comprising a single socket and a single projection entering said socket and resilient means for holding said projection in engagement with the opposite walls of said socket, to permit said blade to tilt about an axis substantially parallel to the length of said vibratory member, said projection and socket being shaped to prevent rotation of said projection in said socket.

2. In a clipper, a stationary blade, a movable blade, a vibratory member, means connecting said movable blade and said vibratory member comprising a single socket and a single projection entering said socket and means for applying tension between said blades, said means holding said projection in said socket, said projection and said socket being formed to permit said blade to tilt about an axis substantially parallel to the length of said vibratory member.

3. In a clipper, a stationary blade, a movable blade, a vibratory member, means connecting said movable blade and said vibratory member comprising a socket and a projection entering said socket and means for applying tension between said blades, said means holding said projection in said socket in wedging engagement therewith, but permitting said blade to tilt relative to said vibratory member.

4. In a clipper, a stationary blade, a movable blade, a vibratory member, means connecting said movable blade and said vibratory member comprising a socket and a projection entering said socket and resilient means for holding said projection in said socket, said projection engaging said socket at spaced points, to permit tilting of said blade relative to said vibratory member.

5. In a clipper, a stationary blade, a movable blade, a vibratory member, means connecting said movable blade and said vibratory member comprising a socket and a projection entering said socket and resilient means for holding said projection in said socket, said projection engaging said socket at spaced points, said points of engagement being out of transverse alignment.

6. In a clipper, a stationary blade, a movable blade, a vibratory member, means connecting said movable blade and said vibratory member comprising a socket and a projection entering said socket and resilient means for holding said projection in said socket, said projection engaging said socket at spaced points on one side thereof and between said points of engagement at the other side thereof.

7. In a clipper, a stationary blade, a movable blade, a vibratory member, means connecting said movable blade and said vibratory member comprising a socket and a projection entering said socket and resilient means for holding said projection in said socket, said projection being bevelled and engaging said socket at spaced points, to permit tilting of said blade relative to said vibratory member.

8. In a clipper, a stationary blade, a movable blade, a vibratory member, means connecting said movable blade and said vibratory member comprising a socket and a projection entering said socket and resilient means for holding said projection in said socket, said projection being bevelled and engaging said socket at spaced points on one side thereof and between said points of engagement at the other side thereof.

9. In a clipper, a stationary blade, a movable blade, a vibratory member, means connecting said movable blade and said vibratory member comprising a socket and a projection entering said socket and resilient means for holding said projection in said socket, said projection having a reduced end portion extending into said socket and engaging the edge thereof at spaced points.

10. In a clipper, a stationary blade, a movable blade, a vibratory member, means connecting said movable blade and said vibratory member comprising a socket and a projection entering said socket and resilient means for holding said projection in engagement with said socket, said projection having a reduced end portion extending into said socket and engaging the edge thereof at spaced points, the major portion of the width of said socket being greater than the thickness of said projection.

11. In a clipper, a stationary blade, a movable blade, a vibratory member, means connecting said movable blade and said vibratory member comprising a socket and a projection entering said socket and resilient means for holding said projection in said socket, said projection having a reduced end portion extending into said socket and having a curved wall portion engaging the edge thereof.

In witness whereof, I hereunto subscribe my name this 11th day of February, A. D. 1925.

LEO J. WAHL.